United States Patent [19]

Briere

[11] 4,407,666
[45] Oct. 4, 1983

[54] METHODS FOR PROLONGING THE USEFUL LIFE OF A GRAPHITE ELEMENT IN AN OPTICAL FIBER-DRAWING FURNACE

[75] Inventor: Alfred D. Briere, Dudley, Mass.

[73] Assignee: GTE Laboratories Incorporated, Waltham, Mass.

[21] Appl. No.: 298,059

[22] Filed: Aug. 31, 1981

[51] Int. Cl.³ .................... C03B 37/07; C03B 37/01
[52] U.S. Cl. .................................. 65/2; 65/12; 65/13; 65/29; 219/412; 373/27; 373/123
[58] Field of Search .................. 65/2, 12, 13, 29, 356; 373/27, 123, 134; 219/412

[56] References Cited

U.S. PATENT DOCUMENTS

| | | | |
|---|---|---|---|
| 3,697,241 | 10/1972 | Strickland et al. | 65/2 |
| 4,030,901 | 6/1977 | Kaiser | 65/13 X |
| 4,309,201 | 1/1982 | Klop et al. | 65/2 |

FOREIGN PATENT DOCUMENTS 51-197607  7/1976  Japan ...................... 65/13

*Primary Examiner*—Robert L. Lindsay, Jr.
*Attorney, Agent, or Firm*—Fred Fisher

[57] ABSTRACT

An optical fiber drawing furnace includes a graphite element of generally cylindrical shape with a reduced central cross-sectional configuration having a flange at opposite ends thereof and having an axial hole therethrough including a central internal element chamber for receiving a glass preform, means for water cooling the flanges, and means for applying electric power across the flanges to resistively heat the reduced cross-sectional configuration and, hence, the central internal element chamber so that an optical fiber can be drawn from the preform. The invention relates to prolonging the useful life of the graphite element by suitable methods and apparatus. The water used for cooling the flanges can be regulated to a temperature such as to avoid condensation of atmospheric moisture within the room (in which the furnace is located) upon the furnace. The application of electric power across the flanges can be increased and decreased at a gradual rate so as to avoid thermal shock to the graphite element.

12 Claims, 3 Drawing Figures

METHODS FOR PROLONGING THE USEFUL LIFE OF A GRAPHITE ELEMENT IN AN OPTICAL FIBER-DRAWING FURNACE

BACKGROUND OF THE INVENTION

1. Field of the Invention

This invention relates to methods of and apparatus for prolonging the useful life of a graphite element in an optical fiber-drawing furnace. Accordingly, it is a general object of this invention to provide new and improved methods and apparatus of such character.

2. Description of the Prior Art

An optical fiber-drawing furnace of the prior art included a graphite element of generally cylindrical shape with a reduced central cross-sectional configuration and a flange at opposite ends thereof. The element had an axial hole therethrough including a central internal element chamber for receiving a glass preform. The furnace included means for water cooling of the flanges. Means were provided for applying electric power across the flanges to resistively heat the reduced cross-sectional configuration and, hence, the central internal element chamber so that an optical fiber can be drawn from the preform. In the past, a cold graphite element was quickly heated by the rapid application of power across the flanges, which rapid application tended to create thermal shock to the graphite element. Further, in the past, there was disconcern about the temperature of the water used for cooling the furnace flanges. As a result of such disconcern, condensed atmospheric moisture on the outer furnace surface tended to enter the furnace, causing deterioration of the graphite element. After drawing optical fiber from the optical fiber-drawing furnace, at operating temperatures, it was a past practice to reduce the furnace temperature to room temperature when not in production. No mention was made, to the best of knowledge and belief by the applicant hereof, of a "bakeout procedure" in which the furnace temperature is reduced from the operating temperature to a temperature in excess of the ambient room temperature.

In the past, the typical life of the graphite element failed to exceed 15 hours of full operating temperature usage.

SUMMARY OF THE INVENTION

Another object of this invention is to prolong the useful life of the graphite element in a commercial optical fiber-drawing furnace at high temperatures, such as from 1900° C. to 2300° C.

An additional object of the invention is to provide for new and improved methods of and apparatus for reducing the operating cost of an optical fiber-drawing furnace.

Since the cost of a graphite element used in an optical fiber-drawing furnace is relatively high, and the shutdown time required to replace such an element in an optical fiber-drawing furnace is time consuming, it becomes evident that to replace such graphite element frequently in an optical fiber-drawing furnace would be costly in a production stage. Hence, yet another object of this invention is to provide for a longer graphite element life and less downtime for the production of optical fiber because of element replacement.

In accordance with one embodiment of the invention, for use with an optical fiber-drawing furnace, including a graphite element of generally cylindrical shape with a reduced central cross-sectional configuration having a flange at opposite ends thereof and having an axial hole therethrough including a central internal element chamber for receiving a glass preform, means for water cooling the flanges, and means for applying electric power across the flanges to resistively heat the reduced central cross-sectional configuration and, hence, the central internal element chamber, so that an optical fiber can be drawn from the preform, a system is provided for prolonging the useful life of the graphite element. The system includes both a method and an apparatus which, first, regulates the water used for cooling the flanges to a temperature substantially in excess of the dew point of the ambient atmosphere in which the furnace is located so that atmospheric moisture does not condense thereupon and to a temperature not in excess of 98.6° F. so that the flanges can be cooled to a temperature not in excess of average normal human body temperature. Second, thermal shock to the graphite element is avoided by raising the temperature of the chamber of a cold graphite element through the application of electric current by the power means at a gradually increasing rate, not in excess of 1000 amperes per three minutes, until the chamber has achieved an operating temperature of 1900° C. to 2300° C. The furnace is operated and optical fiber is drawn. The chamber is maintained at the operating temperature. Later, the temperature of the chamber of the graphite element is gradually lowered by diminishing the application of current therethrough at an decreasing rate not in excess of 1000 amperes per three minutes until the temperature has achieved a bakeout temperature which is high enough to prevent moisture from entering the axial hole of the graphite element. In accordance with certain features of the invention, the temperature of the chamber of the graphite element is gradually raised from the bakeout temperature to the operating temperature through the application of electric current by the power means at a gradually increasing rate not in excess of 1000 amperes per three minutes. The cooling water is maintained within a temperature range of 65° F. to 85° F., or, more specifically, to a range of 68° F. to 72° F. The bakeout temperature can lie within a range of 550° C. to 600° C. The current rates should not be in excess of 1000 amperes per five minutes.

In accordance with another embodiment, the invention is directed for use with an optical fiber-drawing furnace. The furnace includes a graphite element of generally cylindrical shape with a reduced central cross-sectional configuration. The element has a flange at opposite ends thereof and has an axial hole therethrough including a central internal element chamber for receiving a glass preform. The furnace further includes means for water cooling the flanges and means for applying electric power across the flanges to resistively heat the reduced central cross-sectional configuration and, hence, the central internal element chamber, so that an optical fiber can be drawn from the preform. The furnace is located within a room of a structure. A system for prolonging the useful life of the graphite element can comprise a method and an apparatus, which first, regulates the temperature of the water used for cooling the flanges so as to avoid condensation of the room atmospheric moisture upon the furnace, and, second, gradually increasing and decreasing application of electric power across the flanges so as to avoid thermal shock to the graphite element. In accordance with certain features of the invention, the temperature of the cooling water can be regulated to be substantially equal to the ambient room temperature to avoid condensation of atmospheric moisture upon the furnace.

BRIEF DESCRIPTION OF THE DRAWINGS

Other objects, advantages and features of this invention, together with its construction and mode of operation, will become apparent from the following description, when read in conjunction with the accompanying drawings, in which.

DESCRIPTION OF PREFERRED EMBODIMENTS

Figure 1C:
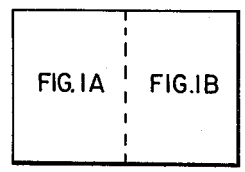
FIGS. 1A and 1B, when assembled together as illustrated in FIG. 1C, form a diagram, partly schematic, partly in cross-section, and partly broken away, of one embodiment of this invention.
Figure 1A:
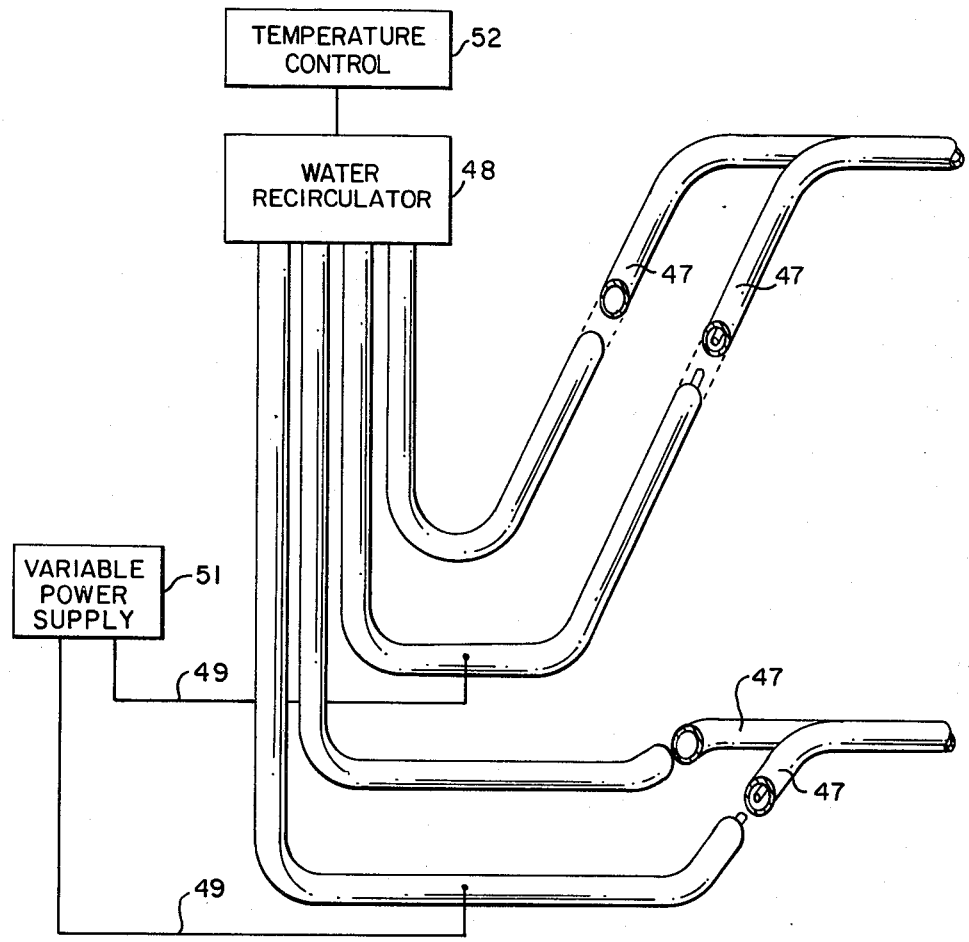
Figure 1B:
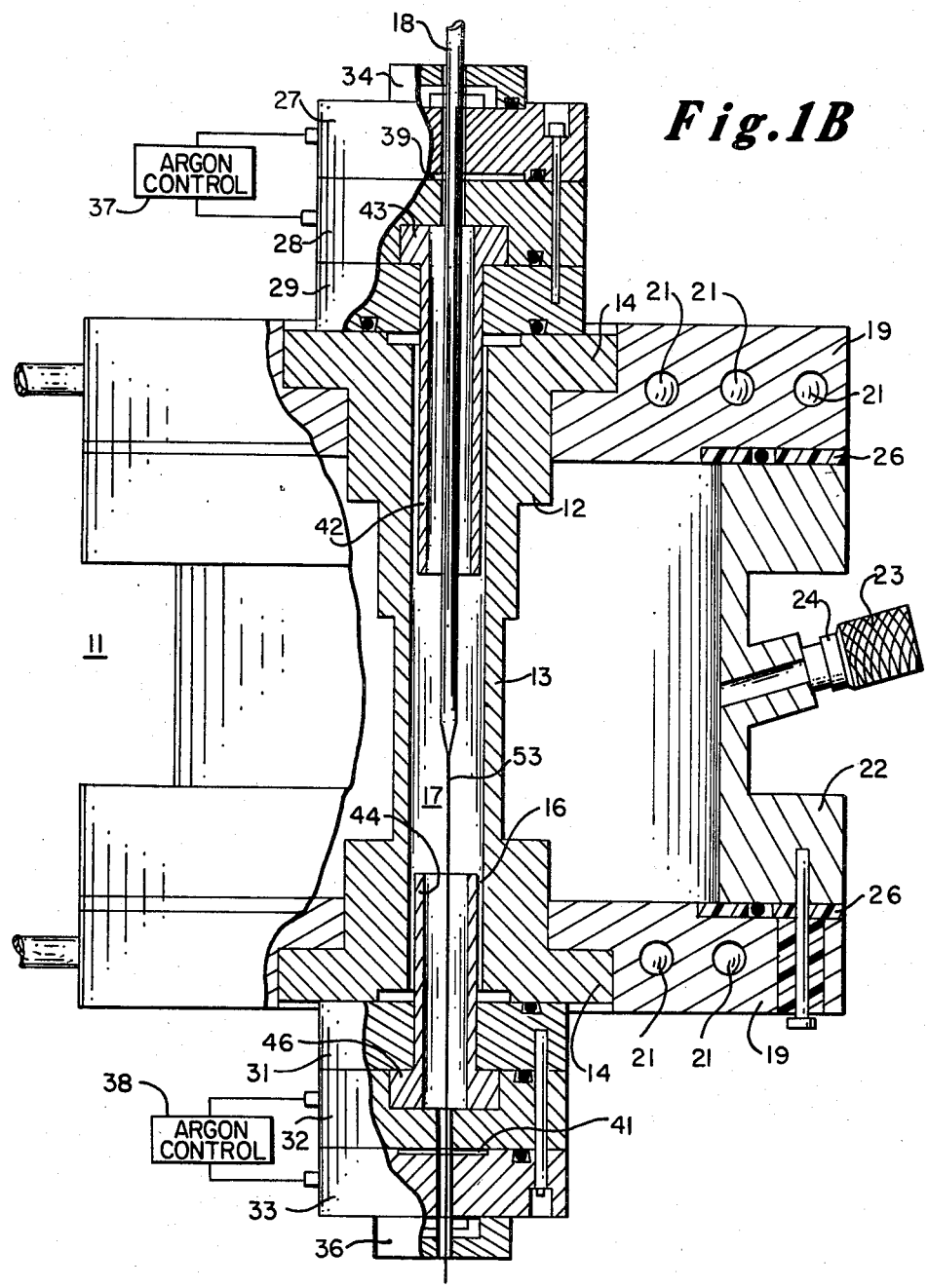

Referring to the drawing, there is depicted an optical fiber-drawing furnace 11 including a graphite heating element 12 of generally cylindrical shape. The graphite element 12, as depicted in the drawing, has a reduced central cross-sectional configuration 13, and has flanges 14—14 at opposite ends thereof. The graphite element 12 has an axial hole 16 therethrough including a central internal element chamber 17 for receiving a glass preform 18.

The optical fiber-drawing furnace 11 further includes a pair of contact flanges 19—19 which are formed so as to support the graphite heating element 12 at the flanges 14—14 thereof within suitable corresponding recesses in the contact flanges 19—19. The contact flanges 19—19 are further formed with ports 21—21 through which water can pass to cool the flanges 14—14 of the graphite heating element so as to reduce thermal losses into the atmosphere. The optical fiber-drawing furnace 11 further includes a circumferential furnace chamber 22 which surrounds, but does not come to physical contact with, the graphite element 12. The furnace chamber 22 can include a sight port 23 for visually inspecting the graphite element 12. Attached to the sight port 23 can be a suitable gas port 24 through which argon or other suitable inert gas can be applied. The furnace chamber 22 is coupled to the contact flanges 19—19 by suitable insulating side shields 26—26. The shields 26—26 are electrically insulating, but, desirably, are not thermally insulating. Although not shown, heat insulation can be applied between the graphite heating element 12 and the circumferential furnace chamber 22.

Although not essential to an understanding of this invention, a plurality of flanges can be applied to the optical fiber-drawing furnace 11 including a top flange 27, which is coupled to a top gas flange 28, which, in turn, is coupled to a coupling flange 29, the coupling flange 29 being applied to one flange 14 of the graphite element 12. In similar fashion, at the opposite end of the graphite heating element 12, its flange 14 is attached to a coupling flange 31, which, in turn, is coupled to a bottom gas flange 32, which, in turn, is coupled to a bottom flange 33. The top flange 27 is coupled to an iris part 34. Similarly, the bottom flange 33 is coupled to an iris part 36. The iris part 34 has a variable iris, as well known to those skilled in the art, which can be adjusted so as to provide an annular diameter which is slightly in excess of the diameter of the preform 18 which passes therethrough. In similar fashion, the annular diameter of the iris part 36 can be varied so as to permit the drawn fiber to pass therethrough.

Argon, applied to the fiber drawing furnace 11, is controlled by separate argon controls 37, 38. The argon control 37 controls argon applied between the top flange 27 and the top gas flange 28. In similar fashion, the argon control 38 controls the argon which is applied between the bottom gas flange 32 and the bottom flange 33. A concentric recess within the top flange 27 acts as a top gas curtain 39. The bottom gas curtain 41 is applied as a concentric recess within the bottom flange 33.

An input exhaust tube 42 is fitted with its central portion within the annular axial hole 16 at the top of the graphite heating element 12. The input tube 42 has a flange 43 which is engaged within a suitable recess in the top gas flange 28 and is held in place by the top coupling flange 29. In similar fashion, and exit exhaust tube 44 is fitted with its central portion within the annular axial hole 16 at the bottom of the graphite element 12. The tube 44 has a flange 46 which is supported by the bottom gas flange 32 and the bottom coupling flange 31. In typical operation, argon (controlled by the argon control 37) passes from the top gas flange 28, through the input exhaust tube 42, upward along the exterior portion of the input exhaust tube 42, and out through the top of the graphite heating element 12. In similar fashion, argon (controlled by the argon control 38) passes upward through the central orifice of the exit exhaust tube 44, into the central internal element chamber 17, downward along the exterior portion of the exhaust tube 44, and out through the bottom of the graphite heating element 12.

Recirculating water is applied through the orifices 21—21 of the contact flanges 19—19 through recirculating pipes 47—47 by means of a water recirculator 48.

Electricity is applied along suitable conduits 49—49 to the contact flanges 19—19, with the conduits 49—49 being suitably water cooled. The water flows through the recirculating pipes 47—47, as illustrated in the drawing.

Power is applied by a variable power supply source 51. The temperature of the recirculating water is regulated by a temperature control 52.

A d.c. electric voltage (for example, 6 volts) is applied across the flanges 14—14 of the conductive graphite element 12. The large resulting current through the reduced central cross-sectional configuration 13 of the graphite element 12 provides a large electric power ($P=I^2R$) to resistively heat the cross-sectional configuration 13, and, hence, the central internal element chamber 17, so that an optical fiber 53 can be drawn from the preform 18.

The useful life of the graphite element 12 can be prolonged through a unique dual practice. One, by regulating the temperature of the water that is used for cooling the flanges 14—14 of the graphite element 12 so as to avoid condensation of room atmospheric moisture upon the furnace 11. Two, by gradually varying the application of electric power across the flanges 14—14 so as to avoid thermal shock to the graphite element 12.

The water that is used for cooling the flanges 14—14 can be regulated to a temperature substantially equal to the ambient temperature of the room in which the furnace 11 is located. Thus, condensation of atmospheric room moisture upon the furnace 11 is avoided.

The temperature of the cooling water for the flanges 14—14 is regulated to be substantially in excess of the dew point temperature of the ambient room atmosphere in which the furnace 11 is located. Thus, atmospheric moisture does not condense upon the furnace 11. Desirably, the cooling water temperature should not be in excess of 98.6° F. so that the flanges 14—14 are no hotter than average normal human body temperature. Through the application of electric current by the variable power supply source 51, at rate not in excess of 1000 amperes per three minutes, the temperature of the chamber 17 of a cold graphite element 12 can be gradually raised, thereby avoiding thermal shock to the element 12. When the chamber 17 has achieved an operating temperature of 1900° C. to 2300° C., the chamber 17 is maintained at the operating temperature, and the furnace 11 is operated to produce drawn optical fiber 53. Subsequently, the operating temperature of the chamber 17 of the graphite element 12 is gradually reduced by diminishing the application of current through the element 12 at a decreasing rate not in excess of 1000 amperes per three minutes. This reduced current rate continues until the chamber 17 has achieved a bakeout temperature which is high enough to prevent moisture from entering the axial hole of the graphite element 12.

The term "bakeout", traditionally, is an engineering term which refers to the degassing of surfaces of a vacuum system by heating during the pumping process in which the gasses and vapors from a vacuum system are removed. Although, technically, the system of this invention does not utilize extreme vacuum, the graphite element 12, in an operating mode, is not maintained in an oxygen atmosphere. The application of oxygen to a heated graphite element is very destructive thereto. The application of water vapor to a heated graphite element is very hazardous thereto and causes short life to the element. Thus, by utilizing the argon as a recirculant inert gas, the graphite element 12 comes into minimal contact with oxygen and water vapor. As stated hereinabove, the temperature of the central internal element chamber 17 of the graphite element is diminished by the application of current therethrough at a decreasing rate not in excess of 1000 amperes per three minutes until the chamber 17 has achieved the bakeout temperature which is high enough to prevent moisture from entering the axial hole 16 of the graphite element 12.

An optional method further includes the gradual raising of the temperature of the chamber 17 of the graphite element 12 from the bakeout temperature to the operating temperature by the application of electric current via the power means 51 at a gradually increasing rate not in excess of 1000 amperes per three minutes.

The cooling water, as stated hereinabove, should be such as to prevent condensation of moisture from the atmosphere upon the furnace. Desirably, the cooling water should be maintained within a temperature range of 65° F. to 85° F. Preferably, the range should be narrowed to 68° F. to 72° F. The bakeout temperature, desirably, lies within range of 550° C. to 600° C. The current rates, as stated above, should not be in excess of 1000 amperes per three minutes; desirably, it should not exceed 1000 amperes per five minutes.

This invention relates to both a method and an apparatus. The apparatus for prolonging the useful life of a graphite element 12 includes a temperature controller 52 for regulating the temperature of the water which is being recirculated by the recirculator 48. The water cools the flanges 19—19 and, hence, the flanges 14—14 of the graphite element 12. The flanges 19—19 and 14—14 are cooled to a temperature substantially in excess of the dew point of the ambient atmosphere in which the furnace 11 is located. Thus, atmospheric moisture does not condense upon the furnace. The water temperature is not in excess of 98.6° F. so that the flanges 14—14 and 19—19 can be cooled to a temperature not in excess of average normal human body temperature.

The apparatus further includes a variable power supply 51 which provides means for avoiding thermal shock to the graphite element 12 by slowly raising the temperature of the chamber 17 of a cold graphite element 12. The temperature is raised through the application of slowly increasing electric current by the variable power supply 51, at a gradually increasing rate not in excess of 1000 amperes per three minutes, until the chamber 17 has achieved an operating temperature of 1900° C. to 2300° C. The furnace 11 is operated with optical fiber 53 being drawn from the preform 18 with the chamber 17 maintained at the operating temperature. The temperature of the heated graphite element 12 is later gradually reduced by diminishing the application of current therethrough at a decreasing rate not in excess of 1000 amperes per three minutes. The current is reduced until the chamber 17 has achieved a bakeout temperature which is high enough to prevent moisture from entering the axial hole of the graphite element 12.

The apparatus, as referred to hereinabove, for prolonging the useful life of the graphite element 12 can further provide means within the variable power supply 51 for gradually raising the temperature of the chamber 17 of the graphite element 21 from the bakeout temperature to the operating temperature through the application of electric current by the power supply at a gradually increasing rate not in excess of 1000 amperes per three minutes.

The temperature control 52 can regulate the water recirculator 48 to maintain the cooling water with a temperature range of 65° F. and 85° F. Preferably, the temperature range should be between 68° F. and 72° F. The bakeout temperature, desirably, is maintained within a range of 550° C. to 600° C.

The apparatus for prolonging the useful life of the graphite element 12 can include means for regulating the temperature of the water used for cooling the flanges 14—14 to a temperature so as to avoid condensation fo atmospheric room moisture upon the flanges 14—14. Such regulating means can, alternately, heat and cool the water so as to maintain the water temperature within a narrow range. The apparatus further includes means for gradually increasing and decreasing the application of electric power across the flanges 14—14 so as to avoid thermal shock to the graphite element 12. This can be achieved through the use of a variable power supply 51.

The cooling water for the flanges can be regulated by a temperature control 52 to a temperature substantially equal to the ambient temperature of the room in which the furnace 11 is located so as to avoid condensation of atmospheric room moisture upon the furnace 11.

The invention is applied in a dual format as follows:
a. The water that is used for cooling the flanges 14—14 of the graphite element 12 is controlled to a temperature 68° F. to 72° F., preferably, and, desirably, no colder. Such temperature control prevents condensation not only on the outside of the furnace 11 but also on the inside of the furnace 11 where it may cause element 12 oxidation and damage to the insulation in the furnace 11.

b. The optical fiber drawing furnace 11 can be run at full operating temperature (1900° C. to 2300° C.) for eight work hours per day. Optionally, it can be run on a 24 hour basis. However, at the end of one shift, with the end of one eight hour work day, the temperature of the element 12 can be reduced to 550° C. to 600° C. (a temperature which is referred hereinabove as a "bakeout" temperature). The furnace 11 is held overnight and on weekends at the "bakeout" temperature to keep any moisture from entering therein. A bakeout temperature prevents oxidation of the element 12 by keeping the element 12 elevated to such a temperature. The expansion and contraction of the element 12, caused by going from a bakeout temperature to an operating temperature, and vice versa, is not as great as going from extreme cold to extreme heat, and vice versa. With this invention, likelihood of breakage of the element 12 is significantly reduced. The temperature of a cold element 12 is raised slowly to full operating temperature. Likewise, the temperature of the element 12 is slowly raised from the bakeout temperature to the operating temperature so as to avoid thermal shock. The furnace 11 is kept under a positive pressure of argon, or other suitable inert gas, during the bakeout procedure so as to prevent oxidation of the element and also to prevent moisture from entering the furnace 11.

By following the principles of the foregoing invention, the operating temperature life of the element 12 can be increased from approximately 15 hours to about 150 hours. Less downtime for the production of fiber 53 is necessary because of element 12 replacement. By increasing the life time of a graphite element from 15 hours to 150 hours, it is readily apparent that the commercial cost of element replacements during production of optical fiber is reduced by 90%.

It will be apparent to those skilled in the art to which this invention pertains that various modifications can be performed without departing from the spirit and scope of this invention as defined in the appended claims. For example, instead of using a positive pressure of argon during bakeout, vacuum conditions can be used. A test of such procedure resulted in an element 12 life of 77 hours. Although it is noted that 77 hours well exceeds the typical 15 hours of the prior art, it does not live up to the typical 150 hours by following the argon procedure as set forth hereinabove. However, because of unrelated problems, the element 12 may have failed prematurely. Thus, it is not clear at this time as to which method is the preferred one to be followed. With the vacuum method or vacuum apparatus, the operating costs would be reduced because it would eliminate the consumption of argon during a bakeout procedure. It is desired, however, that this invention be limited solely by the scope of the allowed claims.

What is claimed is:
1. A method for using an optical fiber-drawing furnace, including a graphite element of generally cylindrical shape with a reduced central cross-sectional configuration having a flange at opposite ends thereof and having an axial hole therethrough including a central internal element chamber for receiving a glass preform, means for water cooling said flanges, and means for applying electric power across said flanges to resistively heat said reduced central cross-sectional configuration and, hence, said central internal element chamber so that an optical fiber can be drawn from said preform, said method prolonging the useful life of said graphite element and comprising
   a. regulating the water used for cooling said flanges to a temperature substantially in excess of the dew point of the ambient atmosphere in which said furnace is located so that atmospheric moisture does not condense thereupon and to a temperature not in excess of 98.6° Fahrenheit so that said flanges can be cooled to a temperature not in excess of average normal human body temperature; and
   b. avoiding thermal shock to said graphic element by raising the temperature of said chamber of a cold graphite element through the application of electric current by said power means at a gradually increasing rate not in excess of one thousand amperes per three minutes until said chamber has achieved an operating temperature of 1900° C. to 2300° C., operating said furnace and producing drawn optical fiber with said chamber maintained at said operating temperature, and gradually lowering the temperature of said chamber of said graphite element by diminishing the application of current therethrough at a decreasing rate not in excess of one thousand amperes per three minutes until said chamber has achieved a bakeout temperature which is high enough to prevent moisture from entering said axial hole of said graphite element.
2. The method as recited in claim 1 further comprising
   c. gradually raising the temperature of said chamber of said graphite element from said bakeout temperature to said operating temperature through application of electric current by said power means at a gradually increasing rate not in excess of one thousand amperes per three minutes.
3. The method as recited in claim 2 wherein
   a. said cooling water is maintained within a temperature range of 65° F. to 85° F.
4. The method as recited in claim 2 wherein said bakeout temperature lies within a range of 550° C. to 600° C.
5. The method as recited in claim 2 wherein
   a. said cooling water is maintained within a temperature range of 68° F. to 72° F., and
   b. and c. said current rates are not in excess of one thousand amperes per five minutes.
6. The method as recited in claim 5 wherein said bakeout temperature lies within a range of 550° C. to 600° C.
7. The method as recited in claim 1 wherein
   a. said cooling water is maintained within a temperature range of 65° F. to 85° F.
8. The method as recited in claim 7 wherein said bakeout temperature lies within a range of 550° C. to 600° C.
9. The method as recited in claim 1 wherein
   a. said cooling water is maintained within a temperature range of 68° F. to 72° F., and
   b. and c. said current rates are not in excess of one thousand amperes per five minutes.
10. The method as recited in claim 9 wherein said bakeout temperature lies within a range of 550° C. to 600° C.
11. A method for using an optical fiber-drawing furnace, including a graphite element of generally cylindrical shape with a reduced central cross-sectional configuration having a flange at opposite ends thereof and having an axial hole therethrough including a central internal element chamber for receiving a glass preform, means for water cooling said flanges, and means for applying electric power across said flanges to resistively heat said reduced central cross-sectional configuration and, hence, said central internal element chamber so that an optical fiber can be drawn from said preform, said furnace being located within a room of a structure, said method prolonging the useful life of said graphite element and comprising a. regulating the water used for cooling said flanges to a temperature such as to avoid condensation of atmospheric moisture within said room upon said furnace; and b. increasing and decreasing application of electric power across said flanges at a gradual rate so as to avoid thermal shock to said graphite element.

12. A method for using an optical fiber-drawing furnace, including a graphite element of generally cylindrical shape with a reduced central cross-sectional configuration having a flange at opposite ends thereof and having an axial hole therethrough including a central internal element chamber for receiving a glass preform, means for water cooling said flanges, and means for applying electric power across said flanges to resistively heat said reduced central cross-sectional configuration and, hence, said central internal element chamber so that an optical fiber can be drawn from said preform, said furnace being located within a room of a structure, said method for prolonging the useful life of said graphite element comprising a. regulating the water used for cooling said flanges to a temperature substantially equal to the ambient temperature of said room so as to avoid condensation of atmospheric moisture within said room upon said furnace; and b. increasing and decreasing application of electric power across said flanges at a gradual rate so as to avoid thermal shock to said graphite element.

\* \* \* \* \*

UNITED STATES PATENT OFFICE
CERTIFICATE OF CORRECTION

Patent No. 4,407,666          Dated October 4, 1983

Inventor(s) Alfred D. Briere

It is certified that error appears in the above-identified patent and that said Letters Patent are hereby corrected as shown below:

Claim 12, line 13 (occu-ring at column 10, line 9) cancel "for".

Signed and Sealed this

Twenty-seventh Day of December 1983

[SEAL]

Attest:

GERALD J. MOSSINGHOFF

Attesting Officer          Commissioner of Patents and Trademarks